Nov. 21, 1967  M. E. KIRKPATRICK  3,353,259
METHOD OF BONDING POROUS TUNGSTEN
Filed Sept. 18, 1964
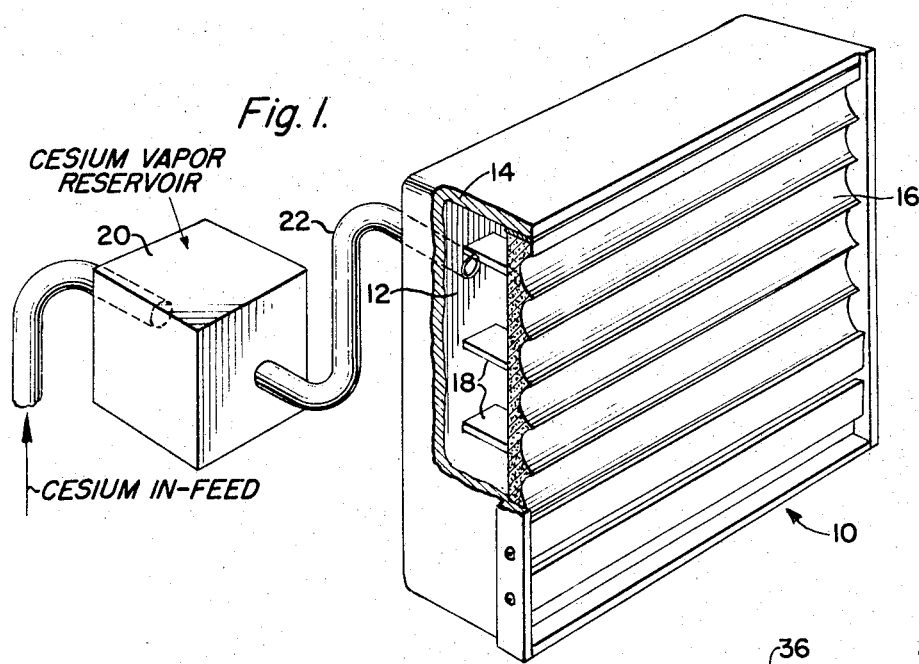
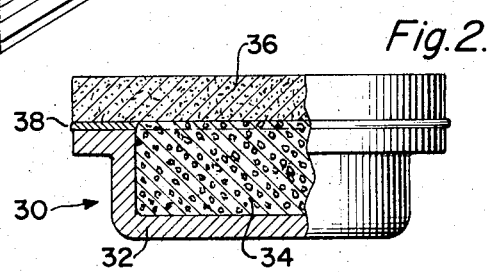
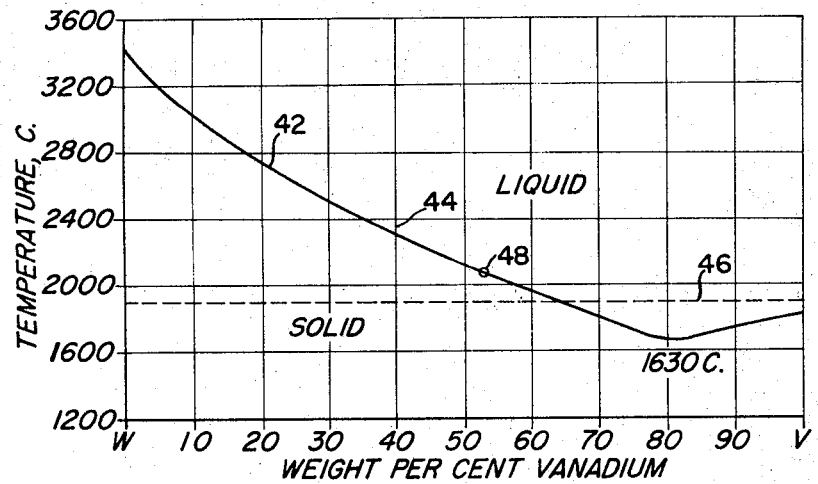
INVENTOR:
MILTON E. KIRKPATRICK,
BY
ATTORNEY.

United States Patent Office 3,353,259
Patented Nov. 21, 1967

3,353,259
METHOD OF BONDING POROUS TUNGSTEN
Milton E. Kirkpatrick, Palos Verdes Estates, Calif.,
assignor to TRW Inc., a corporation of Ohio
Filed Sept. 18, 1964, Ser. No. 397,582
5 Claims. (Cl. 29—487)

ABSTRACT OF THE DISCLOSURE

This invention relates to a method of bonding or brazing porous tungsten to other high melting temperature metals such as molybdenum or tungsten by applying a vanadium interface between the metals to be bonded, heating the metals to melt the vanadium, and heat-treating the metals at slightly reduced temperatures to promote diffusion of the vanadium.

As used hereinafter, the term "porous tungsten" is intended to refer to the material sometimes called sintered tungsten usually having a porosity of approximately 20% of the total volume, such porosity comprising minute channels communicating through the material and through which emissive materials may be caused to flow. Porous tungsten of the type which present invention may employ is now well known in the art and is widely used for the manufacture of certain types of vacuum tubes and in electrostatic propulsion ion engines. One type of porous tungsten is described, for example, in U.S. Patent No. 2,464,517 issued Mar. 15, 1949. Another type of porous tungsten and a method of making the same is described in my copending patent application Ser. No. 317,005 filed Oct. 17, 1963.

In the vacuum tube manufacturing industry, it is often necessary to form cathode structures by joining porous tungsten to base members or support members formed of fully dense tungsten or molybdenum. The bond between such parts must withstand very high temperatures and be free from contamination as well as meeting several other requirements. For example, in the manufacture of dispenser type cathodes, an emissive surface member of porous tungsten is commonly joined to a cup-shaped molybdenum member adapted to contain a quantity of an emissive material such as thorium oxide ($ThO_2$). In operation, the thorium oxide is caused to "boil out" through pores in the tungsten member to form a highly emissive monatomic layer on the external surface of the tungsten. In the operation of certain vacuum tubes, cathode operating temperatures of the order of 2000° to 2200° C. are utilized.

Another application of the present invention is found in the manufacture of emissive members for use in electrostatic propulsion engines of the contact ionization type. In such engines, it is necessary and usual to provide a plenum chamber formed primarily of a fully dense refractory metal such as tungsten or molybdenum to which is hermetically sealed at least one wall portion of porous tungsten. Propellant material such as cesium vapor is continuously supplied to the plenum chamber and is caused to diffuse or transpire through the pores of the porous tungsten wall in a manner such that substantially all the cesium atoms are ionized by contact with the external surface of the porous tungsten. There are a number of difficult problems associated with the manufacture of ion emitter structures for such ion engines. One of the most difficult problems has been the joining of porous tungsten members to fully dense tungsten or molybdenum plenum chambers. One requirement of such assemblies is that the joint must provide a leak-proof hermetic seal so that nonionized cesium vapor is not wasted from the system. An additional requirement is that the assembly must retain substantial mechanical strength when elevated to temperatures approaching 2000° C. Additionally, the joint or braze region must be formed of a material which (1) will not react with or be eroded by highly active materials such as cesium vapor, and (2) will not contaminate the cesium vapor or otherwise decrease the ion emission work function of the porous tungsten.

In addition to simultaneously meeting all the foregoing criteria, the bonding or brazing material must have an initial melting temperature substantially below the temperatures at which deterioration of the porous tungsten may tend to occur. That is, at temperatures of the order of 2400 to 2500° C. sintered porous tungsten begins to suffer from additional sintering-together which results in a deleterious closure of the fine pores accompanied by reduction in the transpiration rate at which cesium vapor flows through the porous tungsten. The brazing material must be capable of wetting the porous tungsten at temperatures below that range.

Accordingly, a primary object of this invention is to provide a method of bonding porous tungsten to other refractory metals which method produces a vacuum-tight hermetic seal, avoids the use of low vapor pressure brazing compounds or compounds which will deteriorate the transpirative character of the tungsten and which forms a bond having reliable mechanical strength at high operating chambers.

It is an additional object of the invention to provide a method of bonding porous tungsten which meets the above mentioned requirements and additionally is immune to erosion by or reaction with alkali metal vapor and the like.

It is a further object of the present invention to provide an improved emitting electrode for electric discharge devices which is capable of operating at temperatures exceeding the temperature levels used in assembling the cathode structure.

All the above mentioned objects and requirements are well satisfied by this invention. However, the foregoing consideration of the problems associated with specific applications of the invention are not to be considered in any way limiting. Rather, in its broader aspects, the invention is generally applicable to the bonding of porous tungsten to other members formed of tungsten or molybdenum. Within the scope of the invention such other members may be porous or non-porous and may take substantially any shape required by the ultimate application.

Briefly, in the practice of this invention, a porous tungsten member is bonded to a fully dense tungsten or molybdenum member by heating the members to be bonded, while assembled with a quantity of vanadium contacting the juxtaposed areas which are to be bonded together. The assembled members are heated to a temperature of about 1900 to 2000° C. at which temperature the vanadium is transformed to the liquid phase and wets the juxtaposed surfaces. The temperature is then lowered somewhat and the assembly is annealed for a time of about one hour or longer at temperatures in the range from 1600 to 1900° C. While this annealing time is not critical, it has been found desirable to anneal the assembly for at least a short time for the purpose of causing progressive alloying of the vanadium with the tungsten. Such alloying converts the bond zone between the two members to a continuous series of solid solutions of tungsten and vanadium. These solid solutions generally have a re-melt minimum temperature substantially higher than the melting tempearture of pure vanadium. Thus a final assembly results which subsequently can be elevated to temperatures substantially exceeding the melting temperature of pure vanadium and exceeding the temperatures used in brazing the members together.

The invention will be better appreciated and more fully understood from the following description of specific applications as shown in the accompanying drawings, wherein:

FIGURE 1 is a perspective view partially in cross-section, showing a typical emitter module of an electrostatic propulsion ion engine.

FIGURE 2 is an enlarged cross-sectional view of a dispenser-type cathode in accordance with the invention.

FIGURE 3 is an alloying diagram useful in explaining the invention.

To provide a fuller understanding of one application wherein the invention has been found particularly advantageous, there is illustrated in FIGURE 1 a single module or section of a typical electrostatic propulsion ion engine. The engine module shown in FIGURE 1 is not, in general, a novel apparatus. One typical engine of the type with respect to which the present invention constitutes an improvement is described in detail in U.S. Patent 3,014,154 issued Dec. 19, 1961, to K. W. Ehlers et al. Another somewhat similar ion propulsion system to which the present invention is applicable is described in detail in copending application, Ser. No. 203,200, filed June 18, 1962, now Patent No. 3,210,926 which is assigned to the same assignee as that of the present invention. Accordingly for brevity only those parts of the ion engine module 10 which are directly pertinent to this invention are described in the following.

The engine module comprises, essentially, a rectangular plenum chamber 12 which is enclosed by a tungsten member 14 forming the rear and side walls of the chamber. The front wall 16 of the chamber comprises a porous tungsten electrode conforming to the rectangular shape of the side walls and having a porosity as discussed heretofore. The inner surface of the porous tungsten member 16 is substantially planar and spaced apart from the inner surface of the member 14 by a plurality of short posts 18 which are secured to and extend outwardly from the member 14. The exterior surface of the porous tungsten member 16 is fluted or longitudinally grooved for reasons which are discussed in full in the above mentioned copending application and which are not relevant to the present invention. In accordance with usual ion engine practice, the emitter module 10 is heated to a temperature of the order of 1200 to 1600° C. by appropriate electrical heaters (not shown) and an alkali vapor propellant such as cesium is continuously fed to the plenum chamber 12 from a vapor reservoir 20 by way of a propellant feed conduit 22.

Such ion propulsion engines are intended for long term deep space missions and therefore operate in a vacuum environment. Accordingly, even though the cesium vapor propellant is supplied to the plenum chamber 12 at an absolute pressure substantially below atmospheric pressure, there is a positive interior-to-exterior pressure applied to the porous tungsten member 16. For that reason, inter alia, it is necessary to mechanically secure the porous tungsten member 16 to the member 14. Additionally, to avoid leakage of un-ionized propellant vapor from the system, it is essential that the member 16 be hermetically sealed along its edges to the side wall portions of the member 14. The present invention relates particularly to the method of bonding the member 16 to the member 14.

The member 14 is usually and preferably formed of a refractory metal metal such as fully dense tungsten or molybdenum so that it is gas-impervious. In accordance with the present invention, pure vanadium is applied to the surface areas of the member 16 which are to be positioned contiguous to the side wall portions of member 14. The members are clamped in the assembled position and heated in vacuum or in a reducing atmosphere to a temperature of the order of 1900 to 2000° C. A few minutes at that temperature is sufficient to melt the interstitial vanadium layer so that it wets the juxtaposed surfaces of the members 14 and 16 and produces a bond therebetween. Where member 14 is formed of fully dense tungsten, the vanadium immediately begins to dissolve the surfaces of both members. The tungsten which is dissolved into the vanadium rapidly forms a continuous series of solid solutions of tungsten and vanadium.

After a few minutes at the temperature required to melt the original vanadium, the furnace temperature is reduced to temperatures between 1600 and 1900° C. and held there for a time of the order of one hour or more. This relatively long term annealing step is desirable in that it promotes the formation of a tungsten-rich alloy between the porous tungsten member 16 and the fully dense member 14. This tungsten-rich alloy firmly bonds the two members together and progressively increases the melting temperature of the bond zone so that the assembly may later be operated or processed at temperatures exceeding the melting temperature of pure vanadium. Thus the composite assembly may be safely subjected to temperatures exceeding 2000° C. without remelting the bond zone. This is particularly advantageous, for example, in situations where it may be desirable to occasionally de-gas the emitter assembly by heating it in vacuo to temperature levels exceeding the normal operating temperatures. After having been so annealed the composite assembly is removed from the brazing furnace and is assembled with the other elements of the system shown in FIGURE 1 for use with a plurality of similar engine modules in an electrostatic propulsion space vehicle.

The particular feature of the present invention just discussed is also advantageous in the manufacture of electron discharge devices. Specifically, the invention makes it possible to process such devices at temperatures higher than the temperatures used in brazing the porous tungsten element to the members which support it. FIGURE 2 illustrates application of the invention in the manufacture of cathode structures for electron tubes. FIGURE 2 shows a typical planar assembly of the dispenser type. The cathode 30 comprises essentially a hat-shaped receptacle 32 which is filled with an emissive material 34 such as $ThO_2$ and is closed across the top by a planar disc 36 of sintered or porous tungsten. As is well known in the art, upon being heated this type of cathode dispenses $ThO_2$ out through the pores of the tungsten member 36. A monatomic layer of $ThO_2$ is formed on the external surface of the porous tungsten disc and is continuously replenished from the supply which is contained within the receptacle 32. In such electron tubes it is necessary that the members 32 and 36 be joined together in a manner such that the cathode assembly can be elevated to temperatures of the order of 2000° C. during the subsequent manufacturing steps involved in incorporating the cathode assembly into a complete electron tube. Further, at least in some specific cases, it is desirable to be able to operate the complete electron tubes at approximately 2200° C. without encountering structural difficulty.

In accordance with the invention, the vanadium forms a braze region 38 between members 32 and 36. The braze region 38, after being annealed as described heretofore, has a remelt temperature substantially exceeding 2000° C. The use of vanadium as a bonding material has another outstanding advantage both in the manufacture of ion engines and in the manufacture of vacuum tubes. Specifically, when vanadium is bonded to the porous tungsten it does not infiltrate the pores of the tungsten member so as to plug the pores or deteriorate the transpirative character of the tungsten. Rather, when the vanadium starts to penetrate a pore in the tungsten, it very quickly reacts with the tungsten walls of the pore and becomes rich in tungsten. As shown by curve 42 in FIGURE 3, as the vanadium is enriched with tungsten, the temperature at which it can remain in the liquid phase rapidly increases. That is, for example, an isolated droplet of vanadium as it approaches the porous tungsten has a melting temperature of about 1900°. When it becomes enriched with tungsten to about the 60% vanadium ratio, it has a minimum melting temperature of about 2000° and when it is further enriched so that it is less than 40% vanadium (as indicated by point 44 in FIGURE 3) the melting temperature has risen to almost 2400° C. This simply means that if a microscopic droplet of vanadium enters a pore in the tungsten member 36, it is quickly enriched with tungsten and freezes before it can penetrate far enough into the porous tungsten to seriously decrease the porosity.

Additionally, the use of vanadium for brazing porous tungsten has the advantages that it does not deteriorate the contact ionization potential of the porous tungsten, it does not react with cesium or other alkali vapors commonly used in ionic propulsion systems and it has an initial melting temperature which is well below the 2400 to 2500° C. range at which additional sintering deterioration of porous tungsten occurs. The following specific example further illustrates the brazing method of the invention as it is used in the assembly of ion emitter modules:

Firstly, the porous tungsten emitter member 16 and the second member 14 are cleaned and de-gased by heating in a hydrogen-environment furnace.

Secondly, a strip of chemically pure vanadium foil between 1 and 2 mils thick is positioned between the inter face surfaces which are to be united and the assembly is clamped together.

Thirdly, the assembly is heated in a high temperature vacuum furnace to a temperature between 1900 and 2000° C. for a time sufficient for all the components to reach temperature equilibrium. The heating time here is not critical. No undesirable effects result from unnecessarily long heating provided that the temperature does not exceed the critical temperature range (2000 to 2200° C.) at which additional sintering of the porous tungsten begins to take place.

Fourthly, the furnace temperature is reduced to between 1600 and 1900° C. and held there for at least one hour for the purpose of inducing additional solid solution diffusion of the tungsten surface into the vanadium. This annealing causes the bond zone solid solution to move along dotted line 46 (FIGURE 3) from right to left until the bond zone reaches approximately the point 48 on curve 42. This provides a braze region or bond zone having about 50–50 ratio solid solution of tungsten and vanadium and having a remelt minimum temperature of 2100 to 2200° C.

Fifthly, the assembled structure is finally incorporated with other conventional components into an ion engine system as illustrated in FIGURE 1. Because of the elevated remelt temperature of the bond zone which this invention provides, the ion engine may be operated at emitter temperatures in the range of 1200–1700° C. without fear of structural failure.

While the foregoing example has described the use of vanadium foil it will, of course, be appreciated that the invention is not so limited but that various other techniques of applying vanadium to the surface to be brazed may be used. For example, another convenient method of applying the vanadium is to make a slurry of vanadium powder with alcohol, or another volatile liquid, and to paint the slurry on one or both surfaces which are to be juxtaposed. Other similar methods involving the deposition of the vanadium in finally divided form obviously may also be used. The vanadium may be deposited from a colloidal suspension of vanadium powder or the powdered vanadium may be dusted or sprayed on to the tungsten surface after the same has been coated with a volatile or dispersible adhesive. In all these alternative methods of applying the vanadium it is, of course, necessary to observe the requirement that the carrier or adhesive must be completely dispersible so that it does not contaminate the braze region with elements which would deteriorate the performance of the ion engine.

While this invention has been described with reference to certain specific embodiments, it will be apparent to those skilled in the art that it is not so limited but is susceptible of various changes and modifications without departing from the spirit and scope thereof.

The embodiments of the invention in which an exclusive property or privilege is claimed are defined as follows:

1. In a process of bonding a first member consisting essentially of porous tungsten to a second member consisting essentially of a metal selected from the class which includes molybdenum and tungsten, the procedure comprising the steps of:

applying a relatively thin layer of substantially pure vanadium to at least a portion of one of said members;

holding said members together in a manner such that said vanadium is disposed between the interface areas which are to be united;

heating at least said interface areas to a temperature between about 1900 to 2000° C. for a time sufficient for said vanadium to be transformed to the liquid phase so that said interface areas are wetted;

and thereafter annealing the assembly at a reduced temperature, of the order of 1600 to 1900° C. at which a continuous series of solid solution alloys of the tungsten and vanadium are formed without formation of a liquid phase.

2. In a method of making an electrically charged particle emitting structure of the type in which a porous diffusion member is joined to a relatively nonporous receptacle member to form a dispensing chamber therebetween for containing a low work function material, and in which each of said members comprises primarily a metal selected from the class which includes tungsten and molybdenum, the procedure comprising the steps of:

applying a thin layer of vanadium to at least one surface of one of said members;

holding said members together with said vanadium between the interface areas which are to be joined;

heating said members to a temperature of the order 1900° C. and at which said vanadium is transformed to the liquid phase to wet said interface areas;

and thereafter annealing the composite structure at temperatures high enough to induce solid solution alloying of the vanadium with the metal of at least one of said members, and low enough to avoid formation of a liquid phase in the region between said interface areas.

3. The method in accordance with claim 2 in which said heating and annealing steps are conducted in vacuo.

4. The method of joining a porous tungsten first part to a second part consisting primarily of a metal of the group consisting of tungsten and molybdenum, said method including the steps of:

applying a layer of vanadium to at least one of said parts in a substantial portion of the area to be juxtaposed to the other part;

holding said parts together;

heating at least the juxtaposed portions of said parts to a temperature of about 1900° C. and thereby transforming said vanadium to the liquid phase;

and thereafter annealing the assembly of parts at a temperature in the range of 1600 to 1900° C. to induce progressive solid solution diffusion between said vanadium and said tungsten whereby the remelt temperature of the bond zone between said parts is elevated to at least about 2000° C.

5. In a process of bonding first and second members together, said first member comprising primarily porous tungsten and said second member consisting essentially of a metal selected from the class which consists of molybdenum and tungsten, the procedure comprising the steps of:

applying a relatively thin layer of nickel-free-vanadium to the area of said first member which is to be bonded to said second member;

holding said members together, with said brazing material positioned between the contiguous areas thereof and heating said members to a temperature such that said brazing material is transformed to the liquid phase and wets said contiguous areas;

and thereafter annealing the composite structure at temperatures of the order of 1600 to 1900° C.; with said annealing temperatures being high enough to induce progressive formation of solid solution alloys of said vanadium with the metal of at least one of said members and low enough to prevent said solid solution alloys from passing into the liquid phase.

References Cited

UNITED STATES PATENTS

| 3,224,071 | 12/1965 | Levi et al. | 29—504 X |
| 3,259,971 | 7/1966 | Gagola et al. | 29—487 X |

JOHN F. CAMPBELL, *Primary Examiner.*

L. J. WESTFALL, *Assistant Examiner.*